United States Patent
Kou et al.

(10) Patent No.: US 10,592,690 B2
(45) Date of Patent: Mar. 17, 2020

(54) METHOD AND APPARATUS FOR DISCOVERING SOCIAL TIES BASED ON CLOAKED TRAJECTORIES

(71) Applicant: Nokia Technologies Oy, Espoo (FI)

(72) Inventors: Qinli Kou, Qinghai (CN); Ye Tian, Beijing (CN); Wendong Wang, Beijing (CN); Zheng Song, Shandong (CN)

(73) Assignee: Nokia Technologies Oy, Espoo (FI)

(*) Notice: Subject to any disclaimer, the term of this patent is extended or adjusted under 35 U.S.C. 154(b) by 191 days.

(21) Appl. No.: 15/554,520

(22) PCT Filed: Mar. 16, 2015

(86) PCT No.: PCT/CN2015/074302
§ 371 (c)(1),
(2) Date: Aug. 30, 2017

(87) PCT Pub. No.: WO2016/145595
PCT Pub. Date: Sep. 22, 2016

(65) Prior Publication Data
US 2018/0046825 A1 Feb. 15, 2018

(51) Int. Cl.
*G06F 21/62* (2013.01)
*G06F 16/901* (2019.01)
(Continued)

(52) U.S. Cl.
CPC ...... *G06F 21/6245* (2013.01); *G06F 16/9027* (2019.01); *G06F 21/62* (2013.01);
(Continued)

(58) Field of Classification Search
CPC ....... G06F 21/62; G06Q 50/01; H04W 4/029; H04W 4/21; H04W 4/02
See application file for complete search history.

(56) References Cited

U.S. PATENT DOCUMENTS 8,185,131 B2* 5/2012 Wood .................... H04W 4/029
455/456.1
8,856,939 B2* 10/2014 Cai ...................... G06F 21/6254
726/26
(Continued)

FOREIGN PATENT DOCUMENTS

CN 102362283 A 2/2012
EP 2228735 A2 9/2010
(Continued)

OTHER PUBLICATIONS

Extended European Search Report received for corresponding European Patent Application No. 15884979.4, dated Oct. 9, 2018, 8 pages.
(Continued)

*Primary Examiner* — Saleh Najjar
*Assistant Examiner* — Feliciano S Mejia
(74) *Attorney, Agent, or Firm* — Mintz Levin Cohn Ferris Glovsky and Popeo, P.C.

(57) ABSTRACT

An approach is provided for discovering social ties among users based on cloaked trajectories. In a method, cloaked regions of a first trajectory of a first user and cloaked regions of a second trajectory of a second user are transformed to corresponding semantic regions, respectively, wherein a semantic region is expressed with a semantic meaning of a corresponding cloaked region. The transformed semantic regions are mapped into nodes of a hierarchical semantic tree, wherein each node of the hierarchical semantic tree corresponds to a semantic region. According to relationships between nodes mapped to semantic regions of the first trajectory and node mapped to the semantic regions of the second trajectory, social ties among the first user and the second user can be inferred.

20 Claims, 8 Drawing Sheets

(51) Int. Cl.
H04W 4/21 (2018.01)
H04W 4/029 (2018.01)
G06Q 50/00 (2012.01)
G06Q 10/04 (2012.01)

(52) U.S. Cl.
CPC ............ *G06Q 10/04* (2013.01); *G06Q 50/01* (2013.01); *H04W 4/029* (2018.02); *H04W 4/21* (2018.02)

(56) References Cited

U.S. PATENT DOCUMENTS

| | | | |
|---|---|---|---|
| 8,958,826 B2* | 2/2015 | Li | H04M 1/00 455/456.3 |
| 9,286,404 B2* | 3/2016 | Frank | G06F 17/212 |
| 9,443,326 B2* | 9/2016 | Krumm | G06K 9/00624 |
| 9,769,107 B2* | 9/2017 | Marti | H04L 51/32 |
| 10,127,564 B2* | 11/2018 | Heath | G06Q 30/02 |
| 2008/0005096 A1 | 1/2008 | Moore | |
| 2010/0064373 A1 | 3/2010 | Cai et al. | |
| 2011/0178943 A1 | 7/2011 | Motahari et al. | |
| 2016/0189186 A1* | 6/2016 | Fabrikant | G06F 16/29 705/7.34 |
| 2017/0195854 A1* | 7/2017 | Shi-Nash | H04W 4/029 |
| 2017/0347237 A1* | 11/2017 | Varshavsky | H04W 4/029 |

FOREIGN PATENT DOCUMENTS

| | | | |
|---|---|---|---|
| IN | 732/CHE/2010 A | 9/2011 | |
| JP | 2010165097 A | 7/2010 | |
| JP | 2011043626 A | 3/2011 | |
| JP | 2013008232 A | 1/2013 | |
| KR | 2014-0073701 A | 6/2014 | |

OTHER PUBLICATIONS

Yu et al., "Geo-Friends Recommendation in GPS-based Cyber-Physical Social Network", International Conference on Advances in Social Networks Analysis and Mining, Jul. 25-27, 2011, pp. 361-368.
Office action received for corresponding Japanese Patent Application No. 2017-546589, dated Oct. 1, 2018, 3 pages of office action and no pages of office action translation available.
Xiao et al., "Inferring Social Ties Between Users With Human Location History", Journal of Ambient Intelligence and Humanized Computing, vol. 5, No. 1, 2014, pp. 3-19.
Cho et al., "Friendship and Mobility: User Movement in Location-Based Social Networks", Proceedings of the 17th ACM SIGKDD international conference on Knowledge discovery and data mining, Aug. 21-24, 2011, pp. 1082-1090.
Hsieh et al., "Inferring Social Relationships From Mobile Sensor Data", Proceedings of the 23rd International Conference on World Wide Web, Apr. 7-11, 2014, pp. 293-294.
Niu et al., "Achieving K-Anonymity in Privacy-Aware Location-based Services", Proceedings IEEE INFOCOM, Apr. 27-May 2, 2014, pp. 754-762.
Tan et al., "Link Prediction Using Protected Location History", Fifth International Conference on Computational and Information Sciences, Jun. 21-23, 2013, pp. 795-798.
Baratchi et al., "On the Use of Mobility Data for Discovery and Description of Social Ties", Proceedings of the IEEE/ACM International Conference on Advances in Social Networks Analysis and Mining, Aug. 25-29, 2013, pp. 1229-1236.
Yao et al., "A Clustering-Based Location Privacy Protection Scheme for Pervasive Computing", IEEE/ACM International Conference on Green Computing and Communications (GreenCom) & International Conference on Cyber, Physical and Social Computing (CPSCom), Dec. 18-20, 2010, pp. 719-726.
Hossain et al., "Privacy-Aware Cloaking Technique in Location-Based Services", IEEE First International Conference on Mobile Services, Jun. 24-29, 2012, pp. 9-16.
Stenneth et al., "Global Privacy and Transportation Mode Homogeneity Anonymization in Location Based Mobile Systems With Continuous Queries", 6th International Conference on Collaborative Computing: Networking, Applications and Worksharing (CollaborateCom), Oct. 9-12, 2010, 10 pages.
Zakhary et al., "Utilizing Social Links for Location Privacy in Opportunistic Delay-Tolerant Networks", IEEE International Conference on Communications, Jun. 10-15, 2012, pp. 1059-1063.
Wang et al., "Privacy Preserving for Continuous Query in Location Based Services", IEEE 18th International Conference on Parallel and Distributed Systems (ICPADS), Dec. 17-19, 2012, pp. 213-220.
Oh et al., "A Privacy Preserving Technique to Prevent Sensitive Behavior Exposure in Semantic Location-Based Service", Procedia Computer Science, vol. 35, 2014, pp. 318-327.
Gedik et al., "Protecting Location Privacy With Personalized K-Anonymity: Architecture and Algorithms", IEEE Transactions on Mobile Computing, vol. 7, No. 1, Jan. 2008, pp. 1-18.
International Search Report and Written Opinion received for corresponding Patent Cooperation Treaty Application No. PCT/CN2015/074302, dated Jul. 28, 2015, 11 pages.

* cited by examiner

METHOD AND APPARATUS FOR DISCOVERING SOCIAL TIES BASED ON CLOAKED TRAJECTORIES

RELATED APPLICATION

This application was originally filed as PCT Application No. PCT/CN2015/074302 filed Mar. 16, 2015.

FIELD OF THE INVENTION

The present invention generally relates to information technology and social network technology. More specifically, the invention relates to methods and apparatus for discovering social ties of users based on their cloaked trajectories.

BACKGROUND

Location-based social network applications have become highly popular over the world. Increasing number of people is using Global Positioning System (GPS)-enabled devices to log their outdoor locations and activities. It is also getting very common for people to share information about their current locations and activities with their friends. This shared information is expected to give significant impact in social networks. Recent research has shown that the mobility patterns of individuals may be shaped by their social relationships. Likewise, human trajectories may be used to infer social ties of people in terms of relationships among individuals. For example, social ties are usually inferred by the similarity of individuals in both spatial and temporal dimensions according to their location histories.

Generally, it is impractical to discover social ties by using accurate geographic locations, because it may cause a privacy leakage. As location information is very useful privacy information, an untrusted application server may save users' location data and leak them to third parties that create privacy risks. Spatial cloaking is a common technique for providing location privacy. The cloaked trajectories can reflect certain regularities of the human mobility with inexact location information, while avoiding the risk of leaking accurate geographic locations. However, the cloaked trajectories are imprecise, making it more difficult to analyze trajectories for further inferring social ties.

Thus, it would be advancement in the art to provide an approach to discover social ties from cloaked trajectories efficiently and precisely.

SOME EXAMPLE EMBODIMENTS

To overcome the problem described above, and to overcome the limitations that will be apparent upon reading and understanding the prior arts, the disclosure provides an approach for According to one embodiment, a method comprises transforming cloaked regions of a first trajectory of a first user and cloaked regions of a second trajectory of a second user to corresponding semantic regions, respectively. A semantic region is expressed with a semantic meaning of a corresponding cloaked region. The method further comprises mapping the transformed semantic regions into nodes of a hierarchical semantic tree. Each node of the hierarchical semantic tree corresponds to a semantic region. The method further comprises inferring social ties among the first user and the second user according to relationships between nodes mapped to semantic regions of the first trajectory and node mapped to the semantic regions of the second trajectory.

In an exemplary embodiment, a cloaked region can be transformed into a corresponding semantic region by selecting more than one sample location in a cloaked region; deriving semantic meanings associated to each of more than one sample locations; and concluding semantic meanings of the cloaked region from the semantic meanings associated to each of more than one sample locations.

In an exemplary embodiment, the semantic meanings of the cloaked region can be the concluded by selecting a semantic region which has a semantic meaning covering all of the semantic meanings associated to the more than one sample locations, as the semantic region of the cloaked region.

In an exemplary embodiment, a semantic meaning associated to a sample location can be derived by a reverse geocoding based on geographic coordinates of the sample location.

In an exemplary embodiment, the method can further comprises identifying semantic regions on the first trajectory and the second trajectory, which occurred within a same time period, as pair regions; identifying semantic regions on the first trajectory and the second trajectory, which occurred within a same time period, as pair regions; deducing a similarity between the first trajectory and the second trajectory from the computed similarities.

In an exemplary embodiment, the similarities between nodes mapped to semantic regions of one pair of identified pair regions can be computed based on factors in at least one of the following three aspects: a level of the lowest common ancestor node of nodes mapped to semantic regions of the one pair of pair regions in the hierarchical semantic tree; the shortest length path between nodes mapped to semantic regions of the one pair of pair regions in the hierarchical tree; and a level of a node mapped to the semantic regions of the one pair of pair regions in the hierarchical tree.

In an exemplary embodiment, regions of the first trajectory and regions of the second trajectory are cloaked through a k-anonymity algorithm according to different privacy levels.

According to another embodiment, an apparatus comprising at least one processor, and at least one memory including computer program code, the at least one memory and the computer program code configured to, with the at least one processor, cause, at least in part, the apparatus to transform cloaked regions of a first trajectory of a first user and cloaked regions of a second trajectory of a second user to corresponding semantic regions, respectively, wherein a semantic region is expressed with a semantic meaning of a corresponding cloaked region; map the transformed semantic regions into nodes of a hierarchical semantic tree, wherein each node of the hierarchical semantic tree corresponds to a semantic region; and infer social ties among the first user and the second user according to relationships between nodes mapped to semantic regions of the first trajectory and node mapped to the semantic regions of the second trajectory.

According to another embodiment, a computer-readable storage medium carrying one or more sequences of one or more instructions which, when executed by one or more processors, cause, at least in part, an apparatus to perform one of the methods discussed above.

According to another embodiment, an apparatus comprises means for performing one of the methods discussed above.

A computer program product including one or more sequences of one or more instructions which, when executed by one or more processors, cause an apparatus to at least perform one of the methods discussed above.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details may be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DETAILED DESCRIPTION OF THE INVENTION

Examples of a method, apparatus, system and computer program for discovering social ties from cloaked trajectories are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention. Like reference numerals refer to like elements throughout.

Figure 1:
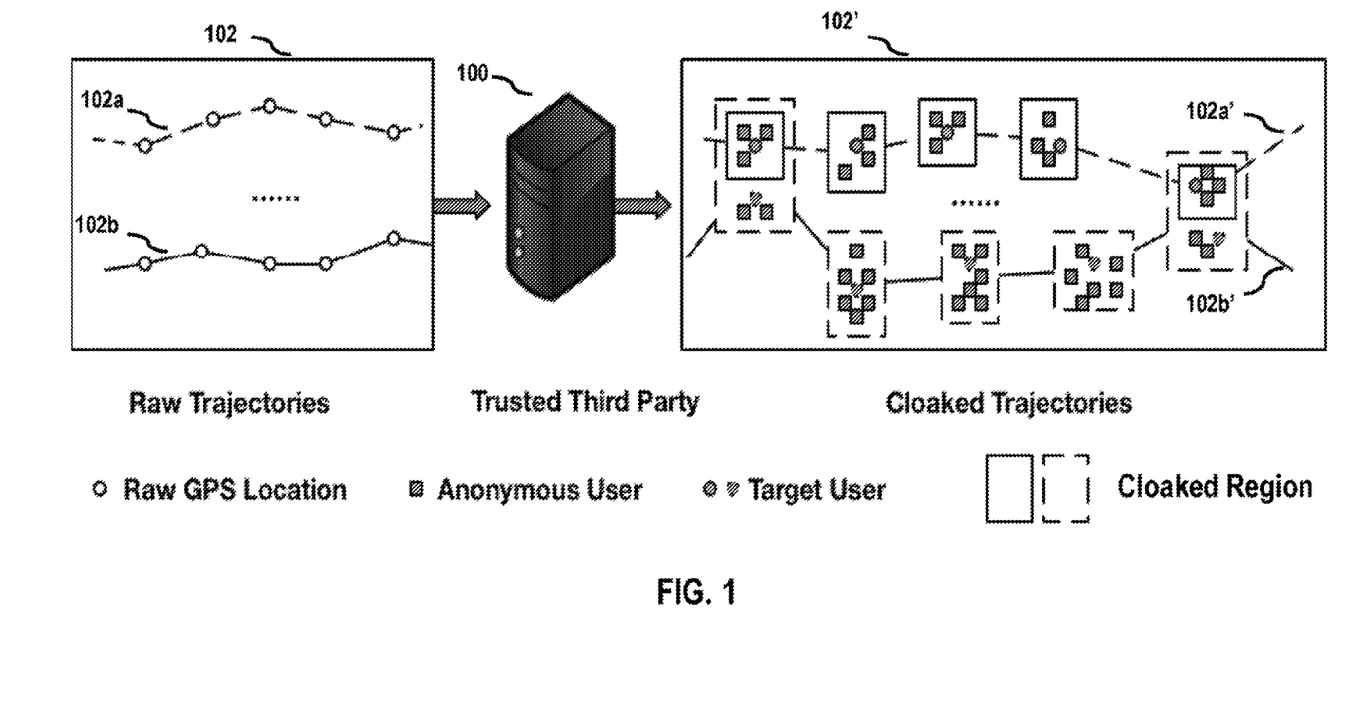
FIG. 1 illustrates an exemplary process for cloaking trajectories by a k-anonymity scheme.

As disused in the background part, the present researches have demonstrated that there exists close correlation between human trajectories and social ties. Some researchers have proposed some solutions to predict social ties by using human historical trajectories. Discovering social ties by using accurate geographic locations would not take the privacy problem into consideration, which may cause the privacy leakage. To address the privacy problem, different approaches have been proposed to support location-based services while protecting the location privacy of mobile users. K-anonymity scheme is an important measure for preventing the disclosure of personal data, through which a user's geographic location is cloaked to be indistinguishable from at least k–1 other users. FIG. 1 illustrates an exemplary process for cloaking trajectories by a k-anonymity scheme. As shown in FIG. 1, a cloaking process may be performed in a device 100, such as a trusted third party. In an example, the device 100 may be a centralized location anonymizer. A location-based service (LBS) related query for locations of a target user may be submitted to a LBS server (not shown) via the centralized location anonymizer. The centralized location anonymizer can retrieve accurate location data for the target user from the LBS server, and then cloak the accurate location by enlarging it into a bigger region covering at least k–1 anonymous users geographically. The region covering k users is called a cloaked region. The cloaked region can be provided as a response to the LBS related query. Similarly, the device 100 may obtain raw trajectories 102a, 102b for two target users, as shown in FIG. 1. At the device 100, the raw trajectories 102a, 102b can be cloaked to 102a', 102b' respectively, by enlarging each accurate location of the raw trajectories into a bigger region (shown with rectangles around each accurate location in FIG. 1) covering at least k–1 other users geographically. A trajectory formed by a sequence of cloaked regions is called a cloaked trajectory.

Although the cloaked trajectories can reflect the human mobility regularity to a certain extent, but the imprecision of such cloaked trajectories make it more difficult to analyze trajectories for further inferring social ties. Furthermore, due to users' different needs in privacy protection, the value of k in k-anonymity scheme is varied among users, and accordingly the sizes of cloaked regions are different among users. This makes it possible to exist a containment relationship among the cloaked regions.

Different from previous researches, embodiments of this disclosure extend a semantic trajectory concept, in which cloaked regions of a cloaked trajectory are transformed into semantic regions so as to form a semantic trajectory. Semantic regions can imply the location contents and personal interests to a great extent, and are helpful to infer social ties of users. Further, embodiments of this disclosure explore the hierarchical relationships of semantic regions, for achieving discovery results of social ties more accurately. As discussed above, since each user may have different needs in privacy protection, which may be reflected for example in his choice of the parameter k in k-anonymity cloaking, there exists containment relationships among cloaked regions. The inherent hierarchical relationships of the semantic regions make it possible to support such containment relationships among cloaked regions. In various embodiments, a hierarchical semantic tree is constructed to represent containment relationships of semantic regions. Each of the nodes in the hierarchical semantic tree corresponds to a semantic region. Semantic regions of semantic trajectories can be mapped to nodes in the tree, for inferring social ties from relationships between respective mapped nodes. For example, a probability of the existence of social ties between two users could be measured according to a similarity of semantic regions of their trajectories. As such, social tie detection can be achieved based on cloaked trajectories which are resulted from a k-anonymity cloaking, without invading location privacies. Meanwhile, different levels of privacy for users can be preserved.

Figure 2:
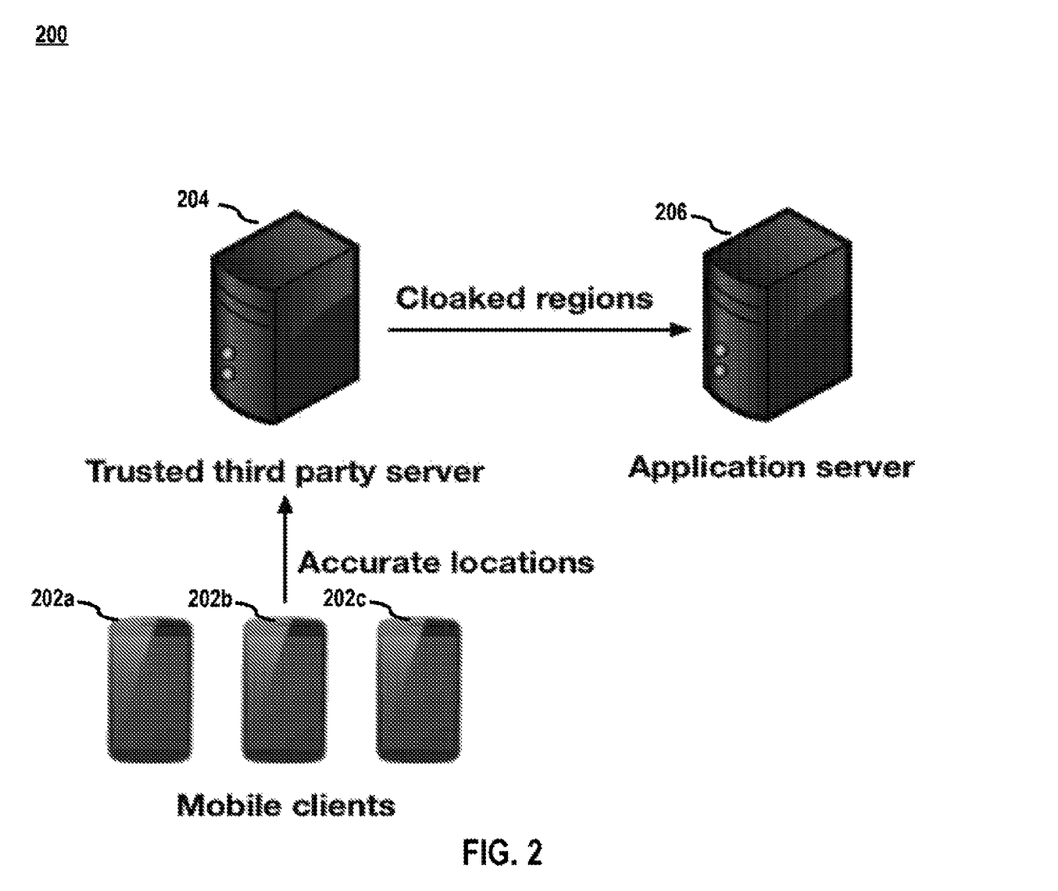
FIG. 2 illustrates a system architecture in which various embodiments may be implemented to infer social ties by using cloaked trajectories.

FIG. 2 illustrates a system architecture in which various embodiments may be implemented to infer social ties by using cloaked tracks. As showed in FIG. 2, a trusted server 204 is configured to transform raw trajectories to cloaked trajectories so as to anonymize user's accurate locations. Then, the cloaked trajectories are forwarded to application servers to support various kinds of services, including a service or an application for inferring social ties from the cloaked trajectories. In some embodiments, the trusted server 204 may collect accurate location data of raw trajectories directly from respective mobile clients on user equipments of users, such as on mobile devices 202a, 202b, 202c. In other embodiments, the accurate location data of raw trajectories may be obtained or retrieved from another server which collects and maintains raw location data. The location data may be raw GPS data of several positions sampled along the trajectories traveled by respective users carrying the mobile devices. The raw trajectories may be anonymized at the trusted server 204 by cloaking accurate locations of the trajectories to cloaked regions, for example with a k-anonymity scheme. Then, the cloaked trajectories formed of cloaked regions may be shared with the application severs 206 to infer social ties at the application severs 206, without invading location privacies of the users.

In some embodiments, the raw trajectories may be cloaked with a k-anonymity algorithm to make the user indistinguishable from k−1 other users, in a way shown in FIG. 1. For example, the trusted server 204 may use rectangles to indicate cloaked regions for convenience of calculation. Since different users may expect different levels of privacy (indicated by k), the size of the cloaked regions of different users are usually different. It should be appreciated that the raw trajectories may be cloaked through any applicable approach or algorithm, which has been developed or to be developed in the future, but is not limited to the k-anonymity scheme or algorithm.

Figure 3:
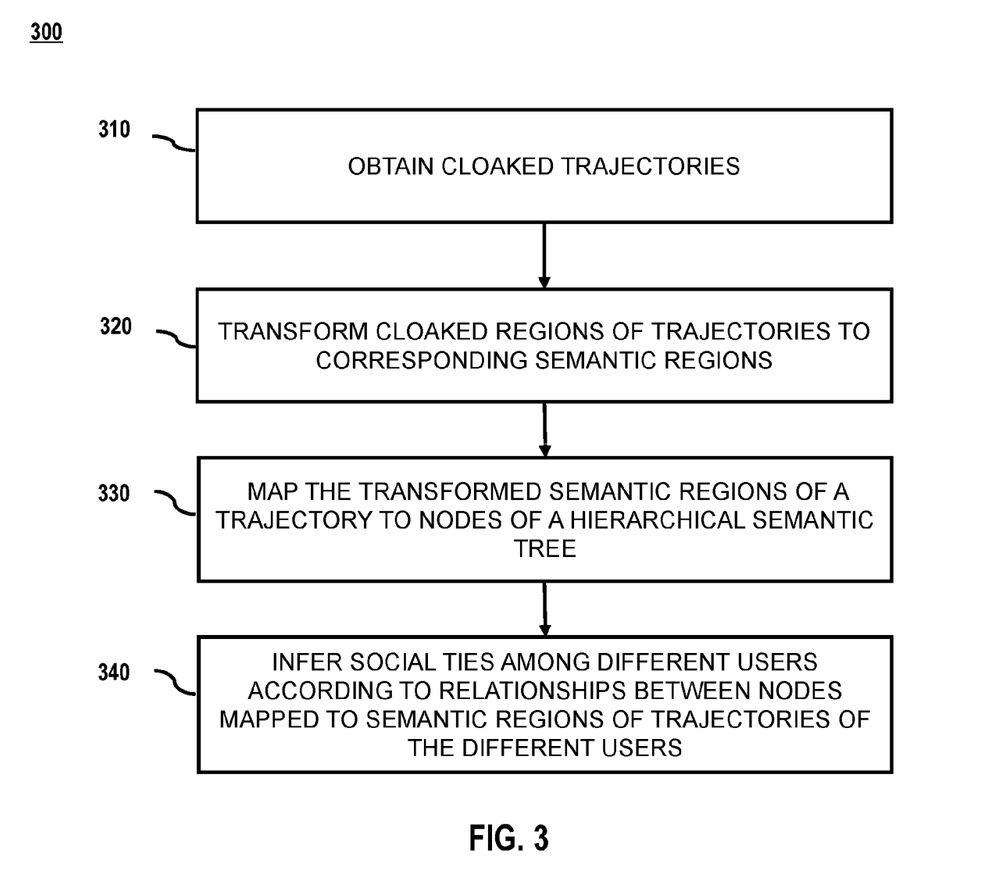
FIG. 3 is a flow diagram of a procedure for inferring social ties of users from cloaked trajectories of the users according to an embodiment of the present invention.

FIG. 3 illustrates a flow diagram of example systems, methods, and/or computer program products for inferring social ties of users from cloaked trajectories of the users according to an embodiment of the present invention. The procedure may be performed at the application server 206 in the system illustrated in FIG. 2. At 310, the application server 206 obtains location data of cloaked trajectories of users, namely sequences of cloaked regions. For the sake of description, we denote the set of users by U={$u_i$: i=1, 2, . . . , U}, and a set of their trajectories by $T_u$, where u∈U, i represents an index of a user, and an integer U represents the total number of the users in the set U. Let $R_u${$R_{u,i}$: i=1, 2, . . . , R} be a set of cloaked regions along a cloaked trajectory $t_u$, wherein i represents an index of a region in the trajectory, and an integer R represents the total number of the regions in the set $R_u$. A trajectory $t_u$ of each user u (denoted by $t_u$) in the set $T_u$ (i.e. $t_u \epsilon T_u$) is composed of a sequence of cloaked regions, at each of which the user u was located during each corresponding time period. As such, let a triple {$R_{u,p}$, $E_{u,p}$, $L_{u,p}$} represent such a specific spatial-temporal portion p of a trajectory $t_u$, where $R_{u,p}$ is a cloaked region in the cloaked trajectory $t_u$, $E_{u,p}$ is the time when the user arrived the region $R_{u,p}$, and $L_{a,p}$ is the time when the user left the region $R_{u,p}$. In an example, the regions can be shaped with rectangle, and thus the location of a cloaked region may be indicated by the x, y-coordinates of its top-left and bottom-right corners. In other examples, the cloaked regions may be shaped with other shapes (such as circle, triangle, ellipse etc.), and accordingly the location of a cloaked region may be indicated by other coordinates or attributes, such as polar coordinates.

At step 320, the application severs 206 transforms the cloaked regions of trajectories to corresponding semantic regions, which are expressed with semantic descriptions or meaning. In other words, the cloaked trajectory is transformed to a semantic trajectory. The semantic trajectories can imply individuals' personal interests and preferences to a great extent. For example, the application severs 206 may find that a cloaked region shaped in a rectangle, which is defined by a particular x and y coordinates of its top-left and bottom-right corners, is exactly located within a park, and then the semantic meanings of the cloaked region may be determined to be a semantic description of the park, such as the name of the park. As such, the cloaked region is transformed to a semantic region expressed with the semantic description of the park. In some embodiments, the semantic region may be derived by use of a POI (point of interest) database, which maintains geography locations information (e.g. latitude and longitude of the locations) of the POIs. Through matching the geographical information of the cloaked region with the geographical information of the POIs, the semantic region of a cloaked region may be determined to be the matched POI.

Some existing applications, such as Google Maps API, are available to provide the semantic information of accurate GPS locations. By using these existing applications, when transforming a location, it is generally necessary to input the accurate latitude and longitude of a location. However, a cloaked region could not be regarded as an accurate location with exact latitude and longitude. Thus, it may not get a relatively accurate result by applying these existing applications directly to transform a cloaked region to a semantic region.

In some embodiments, in order to transform a cloaked region to a semantic region, more than one location in the cloaked region may be selected as a sample set. For example, this can be done by dividing a cloaked region into more than one disjoint sub-rectangles with an equal size and selecting the center point of each sub-rectangle as a sample location. For the sake of description, we denote all of the sample locations in a cloaked region by a set L={$L_i$: i=1, 2, . . . , L}, wherein i represents an index of a sample location in the cloaked region, and an integer L represents the total number of the sample locations in the set L. For each location $L_i$, the semantic meaning associated to it can be derived. In some embodiments, the derivation may be done by a reverse geocoding, for example by using Google Maps API, through which a coordinate obtained by GPS can be converted to a semantic meaning which is easier to understand by the end user, such as a readable street address, place name, country, county subdivisions, etc. Let S be a set that represent all the semantic meanings associated to the locations in L, wherein S={$S_i$: i=1, 2, . . . , S }, and $S_i$ represents the semantic information of a location $L_i$, wherein i represents an index of a semantic meaning in the set S, and an integer S represents the total number of the semantic meanings in the set S.

Next, a relatively accurate semantic region can be concluded from the set S. In this regard, the semantic meanings of all the sample locations of sub-regions in the set S can be compared to derive a semantic region of the cloaked region. There may exist two cases: 1) all of the sample locations in L carry a same semantic meaning, denoted by SM; 2) there exists some differences among semantic meanings of the sample locations. In the first case, it can be concluded that the semantic meaning of the cloaked region is SM. Another case shows that there are more than one semantic meanings in the cloaked regions, which means that none of semantic meanings could cover the cloaked region. In other words, none of semantic regions corresponding to the semantic meanings can satisfy the anonymity level of this user at the moment. Thus, a bigger region which has a semantic meaning covering all of the semantic meanings in the cloaked region can be selected as the semantic region of this cloaked region. In this way, all of the cloaked regions can be transformed into semantic regions in an accurate way. For each cloaked region, $SM_{u,p}$ represents the semantic meaning of the spatial-temporal portion $\{R_{u,p}, E_{u,p}, L_{u,p}\}$.

As the structure of each semantic meaning is inherently hierarchical, the upper the level of a semantic meaning lies in the hierarchical structure, the larger the size of the area covered by the semantic meanings is. In some embodiments, a hierarchical semantic tree can be constructed, in which each node of the tree corresponds to a semantic region. The root node of the tree is the largest region among all nodes. In the tree, a node of a smaller region contained in a larger region is arranged as a lower-level leaf of the node of the larger region, and multiple disjoint regions contained in a same lager region are arranged as leafs on different branches of the same larger region. As such, a semantic meaning covering all of the semantic meanings of the sample locations can be searched along with the hierarchical structure towards the upper levels until the sample locations share a common upper-level node, and then the common upper-level node can be determined to be corresponded to the semantic region of the cloaked region. The hierarchical semantic tree may be constructed by the application server 206, or obtained by the application server 206 from a third party, such as a sever providing a map application. The hierarchical structure, an example of which is presented in FIG. 5, will be discussed later in further detail.

Figure 4:
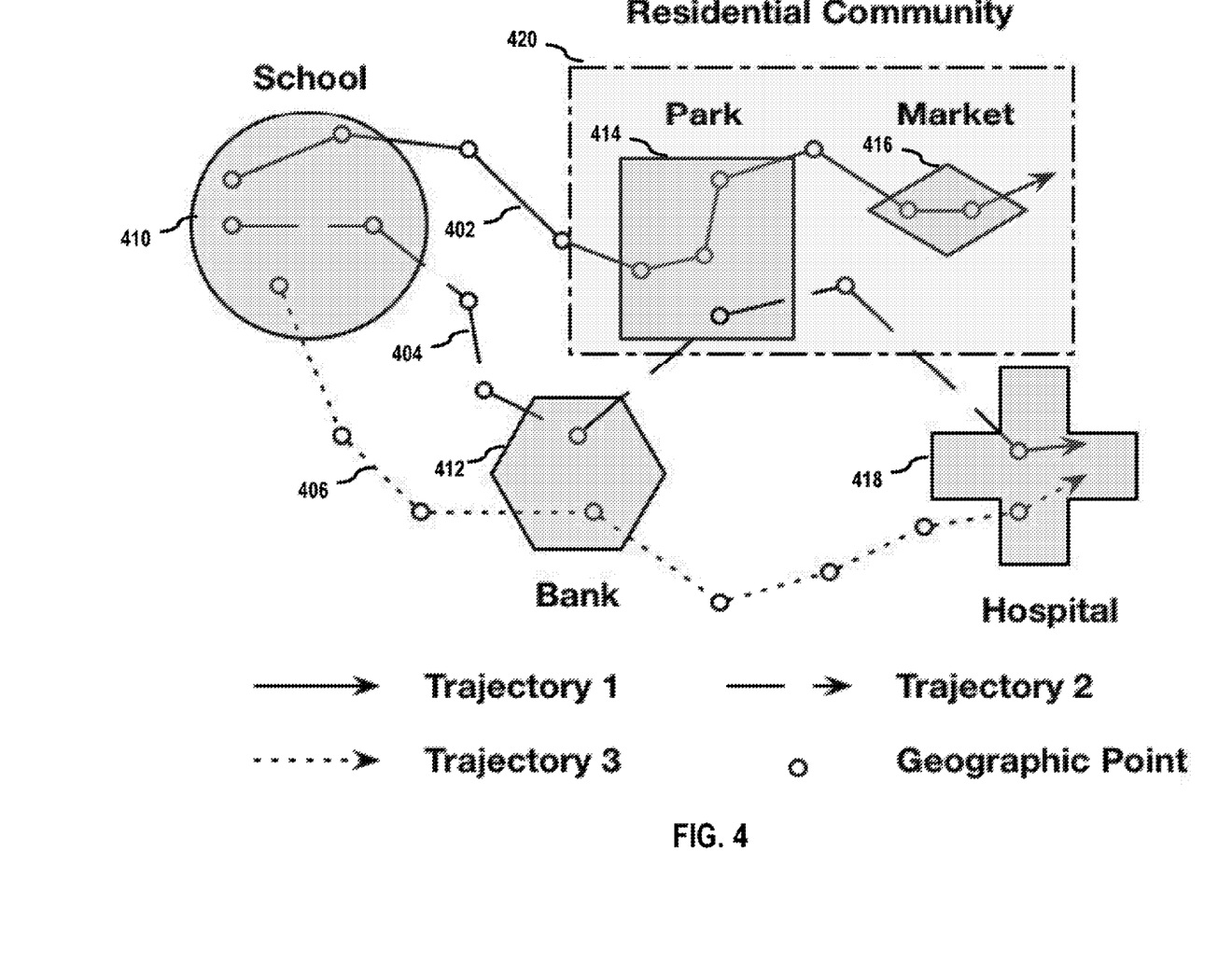
FIG. 4 illustrates a containments relationship of coverage areas among different semantic regions.

As the anonymity levels of individuals may be different, the size of semantic regions may be different too, which would leads to a containment relationship among semantic regions of different individuals. Using an instance of FIG. 4 as an example, trajectories 402, 404, 406 illustrate three raw trajectories of Jack, John, and Tom, respectively. It is assumed that both Jack and John appear at a park at a same timeslot, but the anonymity level of John is high while Jack's is relatively low. The cloaked region for Jack's location at this timeslot may corresponds to a semantic region of the park (the boundary of which is depicted with the block 414). However, the number of users in the park in the timeslot is too few to satisfy John's need in a privacy preserving according to a k-anonymity algorithm. Thus, the cloaked region for John's location at this timeslot may be expanded for satisfying the anonymity level of John. Consequently, the corresponding semantic region of John for the clocked region should also be expanded, for example as the whole residential community (the boundary of which is depicted by the block 420), which is larger in size by containing the park and other semantic regions (such as a market). Intuitively, a person with a larger k-value is more likely to have a larger semantic region, and it may contain a semantic region of a person holding a smaller k-value.

Figure 5:
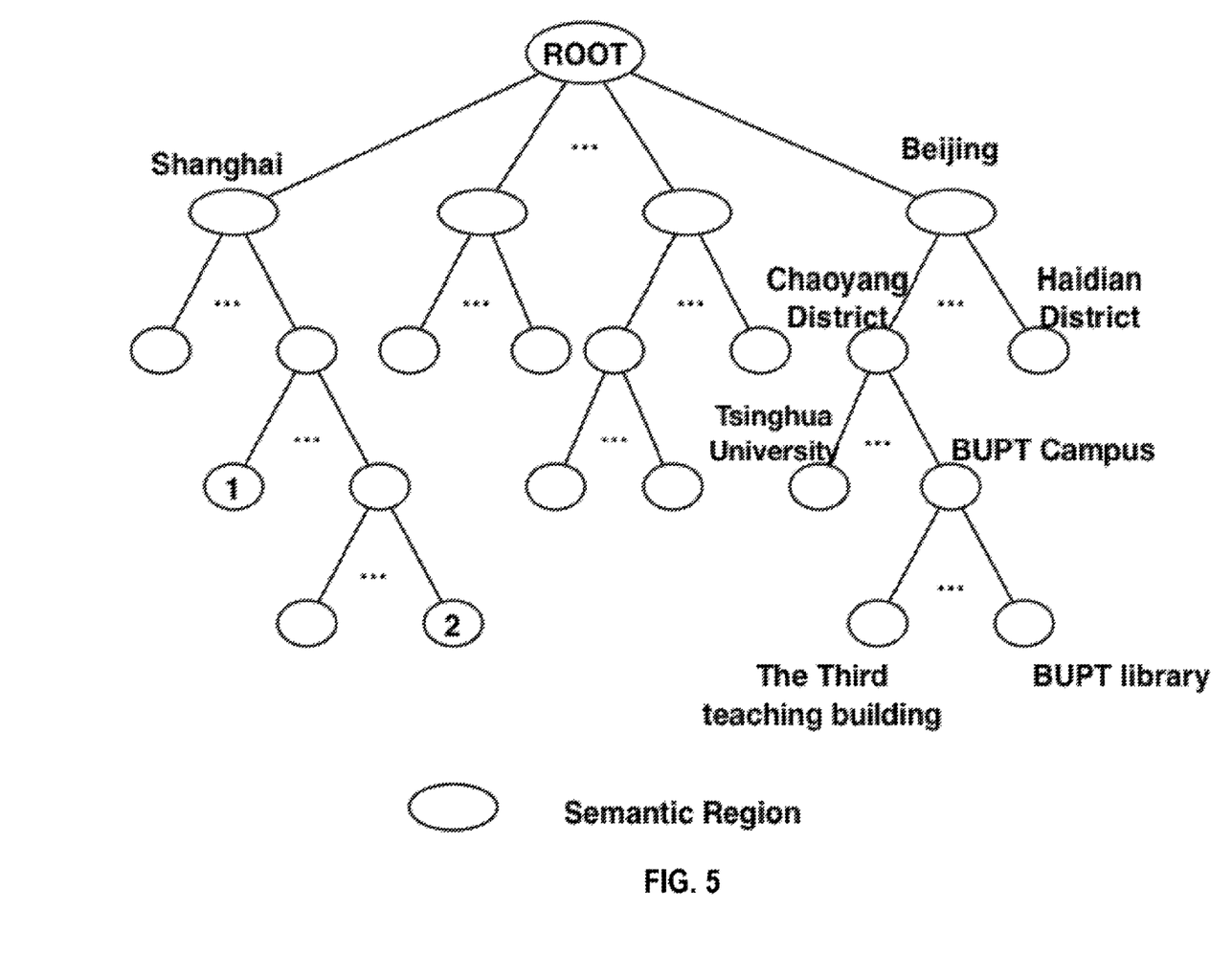
FIG. 5 illustrates an instance of an exemplary hierarchical semantic tree according to an embodiment of the present invention.

A hierarchical structure of semantic regions can be used to efficiently support such containment relationship, which is not only semantic related but also located related. In some embodiments, a hierarchical semantic tree as discussed above is proposed for facilitate a representation of the containment relationship based on the area of all semantic regions. At step 330, the transformed semantic regions of a trajectory can be mapped to nodes of a hierarchical semantic tree. FIG. 5 illustrates an instance of an exemplary hierarchical semantic tree to shown this hierarchical structure. As shown in FIG. 5, semantic regions in upper levels contain semantic regions in lower levels. For example, the region "BUPT Campus" is represented by a node in the tree containing two leaf nodes, "BUPT library" and "The third teaching building". Also, the semantic regions "BUPT Campus" and "Tsinghua University" may be located in adjacent nodes which are both included in the region of an upper-level node, "HaiDian District". Due to the changing population density of semantic regions, a user with a constant privacy level, (denoted by a parameter k), may not stay in regions at the same level all the time. For example, a user in region 1 may move to region 2 in the next timeslot (as shown in FIG. 5).

At step 340, the application severs 206 infers social ties among different users according to relationships between nodes mapped to semantic regions of trajectories of the different users. For example, based on comparisons of the nodes, the similarity of the trajectories of the different users in both spatial and temporal dimensions may be calculated. The similarity between trajectories of different users can reflect social ties among these users. Generally, the possibility of existing social ties mainly depends on the similarity of their trajectories. This is because that the similarity between trajectories implies that the behaviors and mobility patterns of the individuals are matched to each other in a certain extent.

In some embodiments, it is more meaningful to compare the regions with similar time when calculating a similarity of two trajectories. Thus, a concept "pair region" is defined for this comparison in some embodiments. For example, for different users $U_1$ and $U_2$, there may be two trajectories $t_1$ and $t_2$ from $U_1$ and $U_2$, respectively. For two spatial-temporal semantic portions, e.g. one portion $p_i$ on $t_1$ and another portion $p_j$ on $t_2$, which can be defined with $\{R_{u1,pi}, E_{u1,pi}, L_{u1,pi}\}$ and $\{R_{u2,pj}, E_{u2,pj}, L_{u2,pj}\}$, respectively, they can be defined as pair regions if they satisfy a temporal constraint. For example, the temporal constraint may be associated with the times (i.e. $E_{u1,pi}$ and $E_{u2,pj}$) when the users $U_1$ and $U_2$ enter the respective regions $R_{u1,pi}$ and $R_{u2,pj}$, and the times (i.e. $L_{u1,pi}$ and $L_{u2,pj}$) when the users $U_1$ and $U_2$ left the respective regions $R_{u1,pi}$ and $R_{u2,pj}$.

In an example, if two spatial-temporal semantic portions occur on their respective trajectories substantially at a same time period, they will be taken as pair regions. For example, a temporal constraint can be predefined as that both of the users $U_1$ and $U_2$ enter their respective regions within a same time period, and both of the users $U_1$ and $U_2$ left their respective regions within a same time period. In this regard, a function TimeDiff can be defined to compute the time difference between the two moments (the time for entering the region and the time for leaving the region). Then, a temporal constraint can be expressed as TimeDiff $(E_{u1,pi}, E_{u2,pj}) \leq \delta_t$ and TimeDiff $(L_{u1,pi}, L_{u2,pj}) \leq \delta_t$ where $\delta_t$ is a given temporal constraint implying the maximum time difference.

Figure 6:
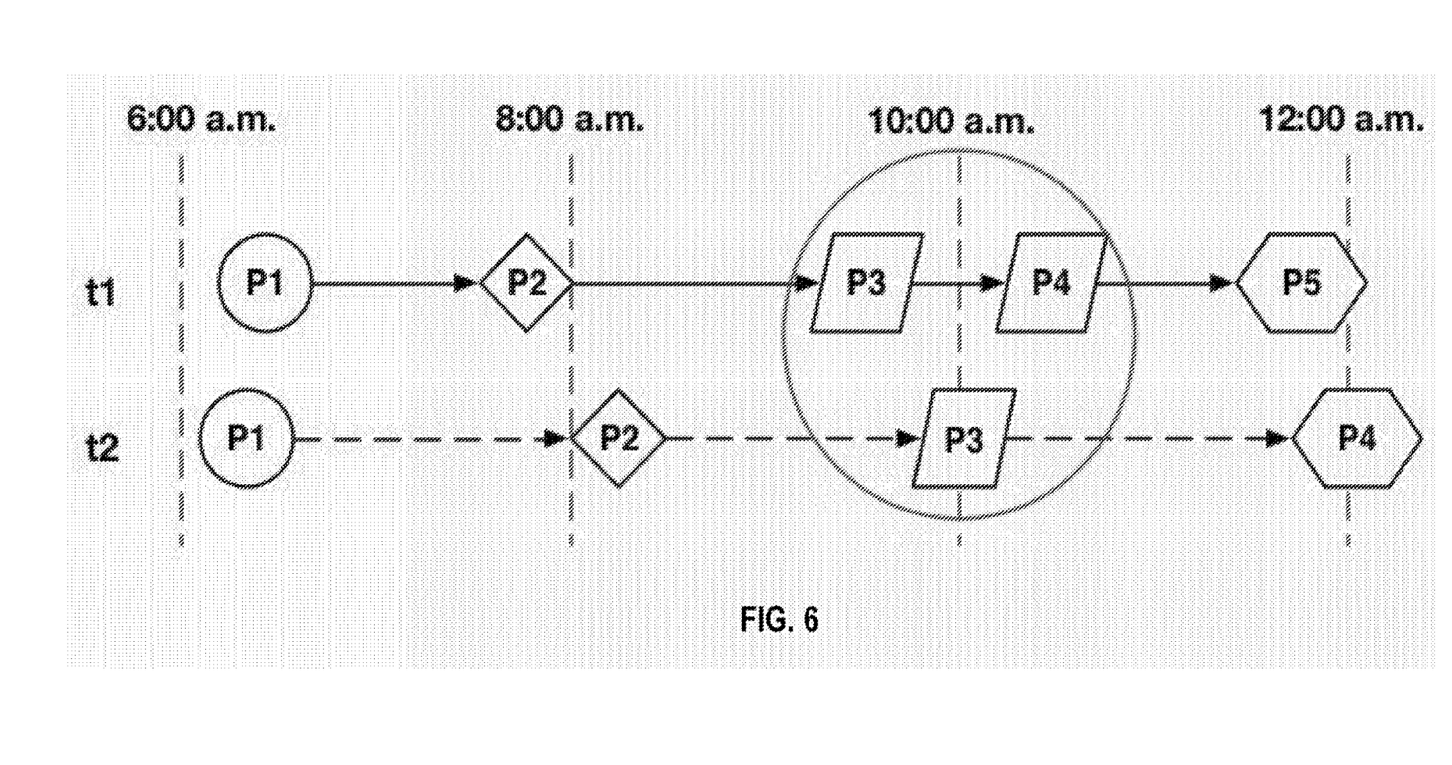
FIG. 6 illustrates an example for identifying pair regions on two trajectories according to an embodiment of the present invention.

In order to guarantee the amount of pair regions on two trajectories and the mobility of individuals, the temporal constraint $\delta_t$ can be set as one hour. However, it is appreciated that $\delta_t$ can be set as any suitable value, including zero. FIG. 6 illustrates an example for identifying pair regions on two trajectories, in which pair regions are denoted with the same shape. As shown in FIG. 6, the spatial-temporal semantic portion $p_1$ in $t_1$ and the spatial-temporal semantic portion $p_1$ in $t_2$ occurred within a same hour (about 6:00 a.m.) and thus can be identified as pair regions. With a similar way, the portion $p_2$ in $t_1$ and the portion $p_2$ in $t_2$ can be identified as pair regions, the portion $p_5$ in $t_1$ and the portion $p_4$ in $t_2$ can be identified as pair regions. Furthermore, it is possible for a region on a trajectory to have more than one paired region on another trajectory. It is because that all of them satisfy the temporal constraint $\delta_t$, just like the paired regions $p_3$ in $t_1$, $p_4$ in $t_1$, and $p_3$ in $t_2$, which are contained in a circle in FIG. 6. In the calculation the similarity of two trajectories, part or all of the available pair regions on them can be measured.

It is feasible to infer social ties by using a hierarchical semantic tree to compute the similarity. In this regard, every semantic region on a trajectory can be corresponded to a node in the hierarchical semantic tree. In theory, it is more likely for people to exist social ties if their mobility patterns match to each other well. For example, their matched mobility patterns may be indicated by that they share same semantic region patterns. Even though their semantic regions are not the same, there could still be social ties between them if their semantic regions are close in the hierarchical semantic tree, or there exists containment relationship between their semantic regions.

In some embodiments, the degree of similarity between two trajectories may be measured with a similarity score. For example, the higher the similarity score is, the more likely that there exists a social tie between the two users of the two trajectories. In order to compute the similarity score of two trajectories, a set of pair regions on their trajectories can be identified firstly. Then, at least part of the identified pair regions on the trajectories can be taken for further computation of the similarity score.

In some embodiments, a similarity score of two trajectories can be computed based on computations for similarities between semantic regions of each pair of pair regions on the two trajectories. The computations for each pair of pair regions can take some important factors for consideration, that are related to the similarity between trajectories, such as the lowest common ancestor node and the length of the shortest path. These factors can be obtained by searching the hierarchical semantic tree based on nodes of the pair regions in the hierarchical semantic tree.

For example, the similarity computation can be considered from factors in at least one of the following three aspects.

(1) A level of the lowest common ancestor node of pair regions in the hierarchical semantic tree. A lower level may lead to a greater impact on similarity, because a lower level represents a smaller semantic region. If the pair regions locate in the same node in the tree, the lowest common ancestor node is itself. If the pair regions locate in different nodes in the tree, the lowest common ancestor node is an upper-level node which corresponds to a smallest region covering all regions in the pair regions.

(2) The shortest length path between nodes of pair regions in the hierarchical tree. It reflects how close of the two pair regions are. Intuitively, two nodes are closer in the tree if they are closer at physical distance.

(3) The influence of the semantic region. It is considered that it is more influential for the prediction if a user's semantic region belongs to a lower level in the hierarchical semantic tree, which means a location of the semantic region is more accurate. As such, the influence can be dependent on a level of the mapped node of each pair region.

For example, the following metrics can be defined to measure the properties and relation of the semantic regions of a pair of pair regions, for example represented by $\{R_{u1,pi}, E_{u1,pi}, L_{u1,pi}\}$ and $\{R_{u2,pj}, E_{u2,pj}, L_{u2,pj}\}$.

lca $(R_{u1,pi}, R_{u2,pj})$: the lowest common ancestor node of a region $R_{u1,pi}$ and a region $R_{u2,pj}$ in the hierarchical semantic tree.

len $(R_{u1,pi}, R_{u2,pj})$: the length of the shortest path from the region $R_{u1,pi}$ to the region $R_{u2,pj}$ in the hierarchical semantic tree.

depth $(R_{u1,pi})$: the length of a path to the region $R_{u1,pi}$ from the root node in the hierarchical semantic tree, which corresponds to a level of the region $R_{u1,pi}$ in the hierarchical semantic tree, and it can be defined that the depth(root)=1.

deep_max: the max depth among the nodes in the hierarchical semantic tree, which is also the length of a path to a node at the lowest level from the root node.

inf$(R_{u1,pi})$: the influence that the region $R_{u1,pi}$ for inferring social ties, which is decided by the level of region $R_{u1,pi}$. In some embodiments, inf$(R_{u1,pi})$ may be a function of depth $(R_{u1,pi})$ and the deep_max. For example, inf$(R_{u1,pi})$ will monotonically increase with respect to depth $(R_{u1,pi})$, and inf$(R_{u1,pi}) \in (0, 1)$.

sim $(R_{u1,pi}, R_{u2,pj})$: the similarity score between the paired regions $R_{u1,pi}$ and $R_{u2,pj}$.

Then, the similarity of two trajectories can be measured at least partly based on the three aspects, including the length of the shortest path between the paired regions, the level of the lowest common ancestor and the influence of the semantic regions. In some embodiments, the similarity score for the regions $R_{u1,pi}$ and $R_{u2,pj}$ can be computed through the following equation:

$$sim(R_{u1,pi}, R_{u2,pj}) = e^{-\alpha \times len(R_{u1,pi}, R_{u2,pj})} \times \left\{ inf(R_{u1,pi}) \times inf(R_{u2,pj}) \times \frac{e^{\beta \times depth(lca(R_{u1,pi}, R_{u2,pj}))} - e^{-\beta \times depth(lca(R_{u1,pi}, R_{u2,pj}))}}{e^{\beta \times depth(lca(R_{u1,pi}, R_{u2,pj}))} + e^{-\beta \times depth(lca(R_{u1,pi}, R_{u2,pj}))}} \right\} \quad (1)$$

where $\alpha$ and $\beta$ are parameters scaling the contribution of the length of the shortest path and the level of the lowest common ancestor, respectively.

Figure 7:
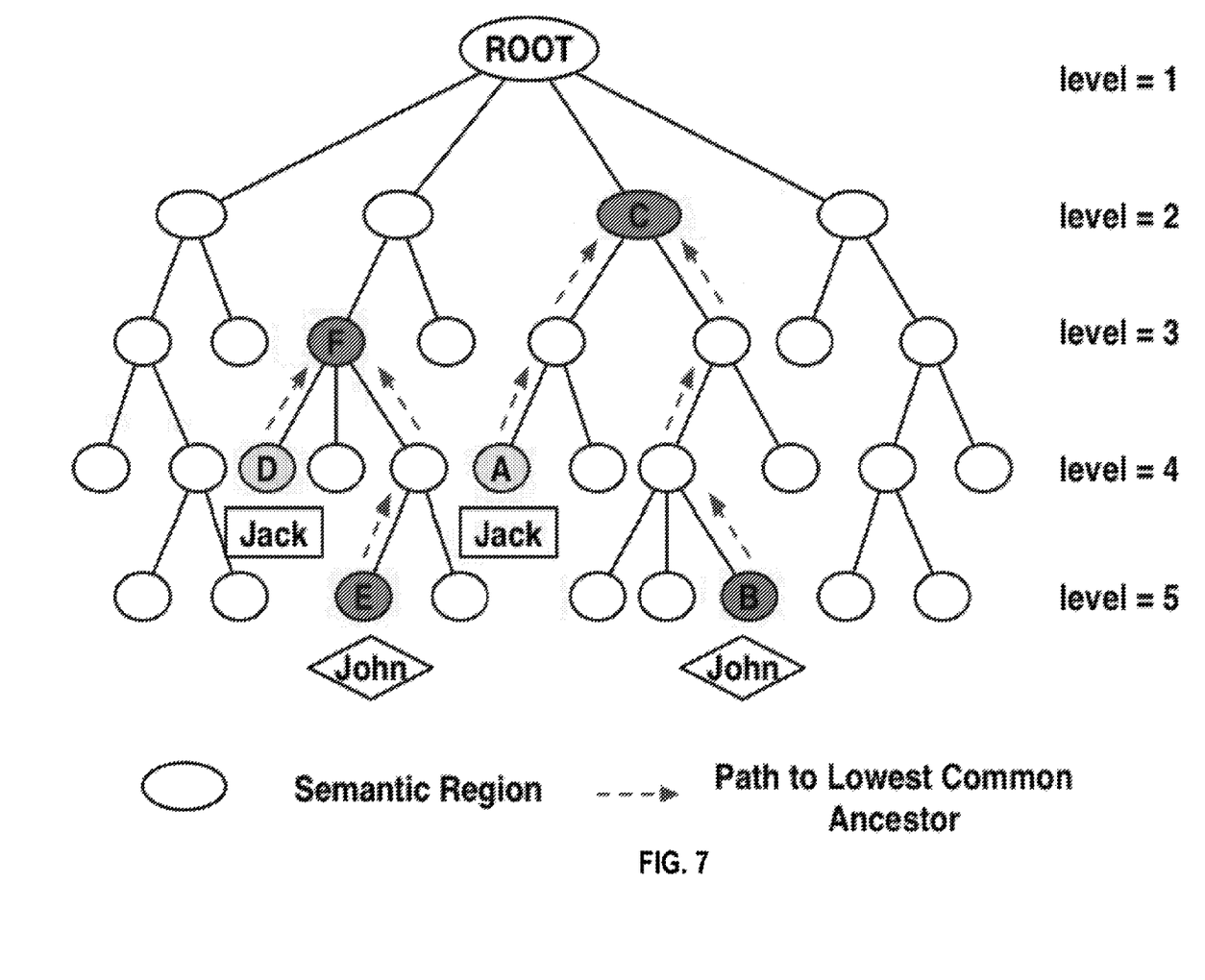
FIG. 7 illustrates an instance of calculating similarities of regions by using a hierarchical semantic tree according to an embodiment of the present invention.

Using FIG. 7 as an example, hypothetically, at a timeslot $m_1$, a semantic region of a user (e.g. $u_1$: Jack) is mapped to covered a node A in the tree (i.e. $SM_{u1,p1}=A$) and a semantic region of another user (e.g. $u_2$: John) is in a node B (i.e. $SM_{u2,p1}=B$). According to the hierarchical semantic tree shown in the FIG. 7, the node C is their lowest common ancestor, which is in the second level, and the length of the shortest path between the node A and the node B is equal to 5. Then, a similarity score of a first pair of pair regions in the two trajectories of Jack and John can be computed, for example based on the equation (1). While at a following timeslot $m_2$, Jack and John may arrive at the other regions mapped to nodes D and E, respectively, and then a second similarity score for this pair of pair regions can also be calculated based on the equation (1). After the calculation of similarity scores for all compared pair regions in the two trajectories, a vector $\vec{s}$ can be set as a similarity vector to record the similarity score (denoted as simPair$_i$) of each of the compared pair regions from the two trajectories, denoted as $\vec{s} = (simPair_1, simPair_2, simPair_i, \ldots, simPair_n)$.

Finally, a similarity score (denoted as Sim($t_1, t_2$)) of two trajectories($t_1, t_2$) can be computed from the similarities of all compared pair regions of the two trajectories. For example, the Sim($t_1, t_2$) can be computed with an equation:

$$Sim(t_1, t_2) = \frac{1}{|\vec{s}|} \times \sum_{i=1}^{n} simPair_i. \quad (2)$$

Figure 8:
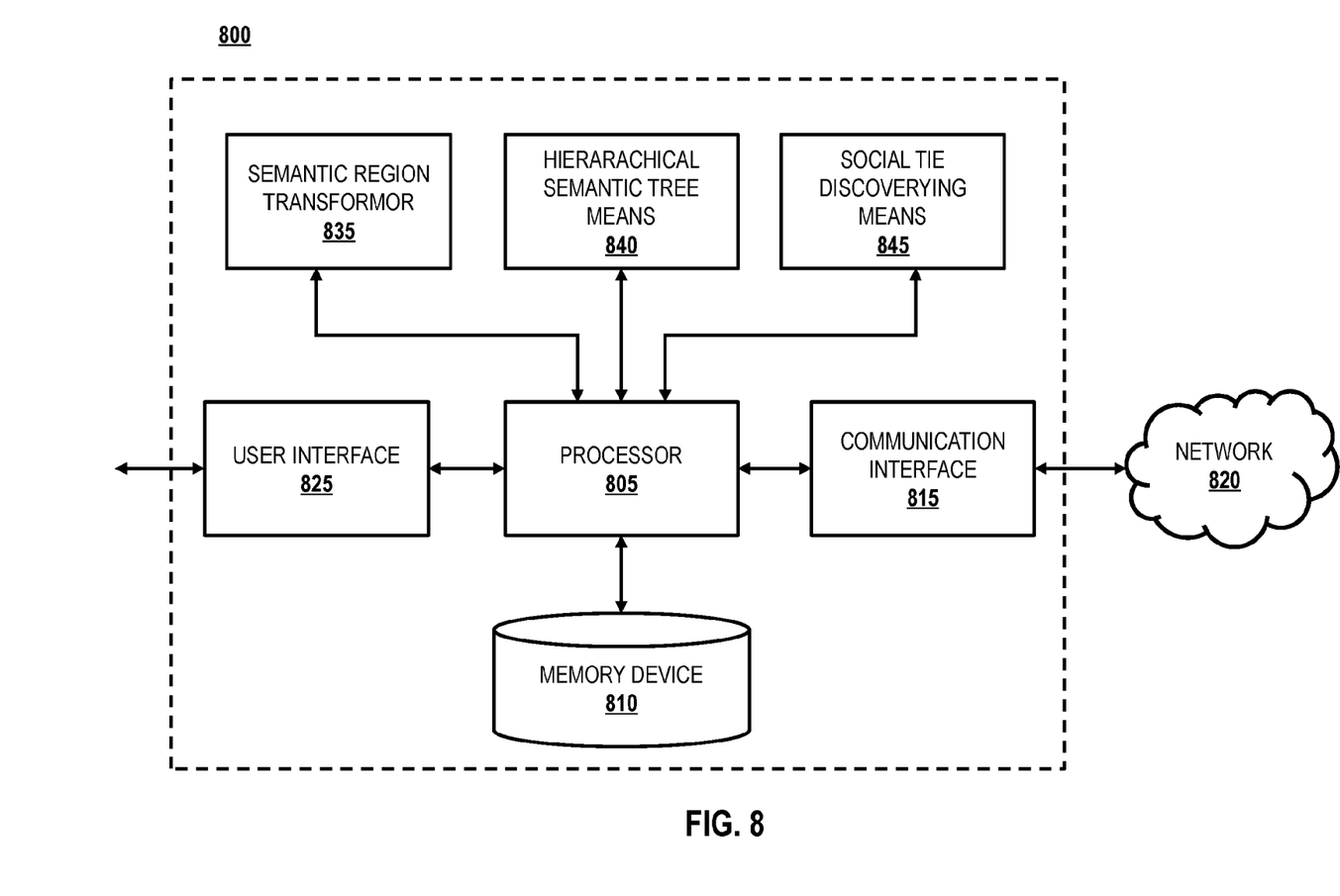
FIG. 8 illustrates a block diagram of an apparatus for discovering social ties from cloaked trajectories according to an example embodiment of the present invention.

Based on the forgoing, FIG. 8 illustrates an example apparatus embodiments of the present invention configured to perform the various functionalities described herein. Referring now to FIG. 8, in some example embodiments, the apparatus 800 may be embodied as, or may be included as, a component of, a communications device with wired or wireless communications capabilities. In some example embodiments, the apparatus 800 may be part of a communications device such as a stationary or a mobile terminal. As a stationary terminal, the apparatus 800 may be part of a computer, server, an access point (e.g., a base station, wireless router, or the like), a device that supports network communications, or the like. Regardless of the type of communications device, apparatus 800 may also include computing capabilities.

The example apparatus 800 includes or is otherwise in communication with a processor 805, a memory device 810, a communications interface 815 and user interface 825. The processor 805 may be embodied as various means for implementing the various functionalities of example embodiments of the present invention including, for example, a microprocessor, a coprocessor, a controller, a special-purpose integrated circuit such as, for example, an application specific integrated circuit (ASIC), an field programmable gate array (FPGA), or a hardware accelerator, processing circuitry or the like. According to one example embodiment, processor 805 may be representative of a plurality of processors, or one or more multiple core processors, operating in concert. Further, the processor 805 may be comprised of a plurality of transistors, logic gates, a clock (e.g., oscillator), other circuitry, and the like to facilitate performance of the functionality described herein. The processor 805 may, but need not, include one or more accompanying digital signal processors. In some example embodiments, the processor 805 is configured to execute instructions stored in the memory device 910 or instructions otherwise accessible to the processor 805. The processor 805 may be configured to operate such that the processor causes the apparatus 800 to perform various functionalities described herein.

Whether configured as hardware or via instructions stored on a non-transitory computer-readable storage medium, or by a combination thereof, the processor 805 may be an entity capable of performing operations according to example embodiments of the present invention while configured accordingly. Thus, in example embodiments where the processor 805 is embodied as, or is part of, an ASIC, FPGA, or the like, the processor 805 is specifically configured hardware for conducting the operations described herein. Alternatively, in example embodiments where the processor 805 is embodied as an executor of instructions stored on a computer-readable storage medium, the instructions specifically configure the processor 805 to perform the algorithms and operations described herein. In some example embodiments, the processor 805 is a processor of a specific device (e.g., an application server 206) configured for employing example embodiments of the present invention by further configuration of the processor 805 via executed instructions for performing the algorithms, methods, and operations described herein.

The memory device 810 may be one or more computer-readable storage media that may include volatile and/or non-volatile memory. In some example embodiments, the memory device 810 includes Random Access Memory (RAM) including dynamic and/or static RAM, on-chip or off-chip cache memory, and/or the like. Further, memory device 810 may include non-volatile memory, which may be embedded and/or removable, and may include, for example, read-only memory, flash memory, magnetic storage devices (e.g., hard disks, floppy disk drives, magnetic tape, etc.), optical disc drives and/or media, non-volatile random access memory (NVRAM), and/or the like. Memory device 810 may include a cache area for temporary storage of data. In this regard, some or all of memory device 810 may be included within the processor 805.

Further, the memory device 810 may be configured to store information, data, applications, computer-readable program code instructions, and/or the like for enabling the processor 805 and the example apparatus 800 to carry out various functions in accordance with example embodiments of the present invention described herein. For example, the memory device 810 could be configured to buffer input data for processing by the processor 805. Additionally, or alternatively, the memory device 810 may be configured to store instructions for execution by the processor 805.

The communication interface 815 may be any device or means embodied in either hardware, a computer program product, or a combination of hardware and a computer program product that is configured to receive and/or transmit data from/to a network and/or any other device or module in communication with the example apparatus 800. In some example embodiments, the communications interface may be part of, or include, a wireless modem connected to a personal computer. Processor 805 may also be configured to facilitate communications via the communications interface by, for example, controlling hardware included within the communications interface 815. In this regard, the communication interface 815 may include, for example, one or more antennas, a transmitter, a receiver, a transceiver and/or supporting hardware, including, for example, a processor for enabling communications. Via the communication interface 815, the example apparatus 800 may communicate with various other network entities in a device-to-device fashion and/or via indirect communications via a base station, access point, server, gateway, router, or the like.

The communications interface 815 may be configured to provide for communications in accordance with any wired or wireless communication standard. The communications interface 815 may be configured to support communications in multiple antenna environments, such as multiple input multiple output (MIMO) environments. Further, the communications interface 815 may be configured to support orthogonal frequency division multiplexed (OFDM) signaling. In some example embodiments, the communications interface 815 may be configured to communicate in accordance with various techniques, such as, second-generation (2G) wireless communication protocols, IS-136 (time division multiple access (TDMA)), GSM (global system for mobile communication), IS-95 (code division multiple access (CDMA)), third-generation (3G) wireless communication protocols, such as Universal Mobile Telecommunications System (UMTS), CDMA2000, wideband CDMA (WCDMA) and time division-synchronous CDMA (TD-SCDMA), 3.9 generation (3.9G) wireless communication protocols, such as Evolved Universal Terrestrial Radio Access Network (E-UTRAN), with fourth-generation (4G) wireless communication protocols, international mobile telecommunications advanced (IMT-Advanced) protocols, Long Term Evolution (LTE) protocols including LTE-advanced, or the like. Further, communications interface 815 may be configured to provide for communications in accordance with techniques such as, for example, radio frequency (RF), infrared (IrDA) or any of a number of different wireless networking techniques, including WLAN techniques such as IEEE 802.11 (e.g., 802.11a, 802.11b, 802.11g, 802.11n, etc.), wireless local area network (WLAN) protocols, world interoperability for microwave access (WiMAX) techniques such as IEEE 802.16, and/or wireless Personal Area Network (WPAN) techniques such as IEEE 802.15, BlueTooth (BT), low power versions of BT, ultra wideband (UWB), Wibree, Zigbee and/or the like. The communications interface 815 may also be configured to support communications at the network layer, possibly via Internet Protocol (IP).

The user interface 825 may be in communication with the processor 805 to receive user input via the user interface 825 and/or to present output to a user as, for example, audible, visual, mechanical or other output indications. The user interface 825 may include, for example, a keyboard, a mouse, a joystick, a display (e.g., a touch screen display), a microphone, a speaker, or other input/output mechanisms. Further, the processor 805 may comprise, or be in communication with, user interface circuitry configured to control at least some functions of one or more elements of the user interface. The processor 805 and/or user interface circuitry may be configured to control one or more functions of one or more elements of the user interface through computer program instructions (e.g., software and/or firmware) stored on a memory accessible to the processor 805 (e.g., volatile memory, non-volatile memory, and/or the like). In some example embodiments, the user interface circuitry is configured to facilitate user control of at least some functions of the apparatus 800 through the use of a display and configured to respond to user inputs. The processor 805 may also comprise, or be in communication with, display circuitry configured to display at least a portion of a user interface, the display and the display circuitry configured to facilitate user control of at least some functions of the apparatus 800.

The semantic region transformer 835, the hierarchical semantic tree means 840, and/or the social tie discovering means 845 of example apparatus 800 may be any means or device embodied, partially or wholly, in hardware, a computer program product, or a combination of hardware and a computer program product, such as processor 805 implementing stored instructions to configure the example apparatus 800, memory device 810 storing executable program code instructions configured to carry out the functions described herein, or a hardware configured processor 805 that is configured to carry out the functions of the semantic region transformer 835, the hierarchical semantic tree means 840, and/or the the social tie discovering means 845 as described herein. In an example embodiment, the processor 805 includes, or controls, the semantic region transformer 835, the hierarchical semantic tree means 840, and/or the social tie discovering means 845. The semantic region transformer 835, the hierarchical semantic tree means 840, and/or the social tie discovering means 845 may be, partially or wholly, embodied as processors similar to, but separate from processor 805. In this regard, the semantic region transformer 835, the hierarchical semantic tree means 840, and/or the social tie discovering means 845 may be in communication with the processor 805. In various example embodiments, the semantic region transformer 835, the hierarchical semantic tree means 840, and/or the social tie discovering means 845 may, partially or wholly, reside on differing apparatuses such that some or all of the functionality of the semantic region transformer 835, the hierarchical semantic tree means 840, and/or the social tie discovering means 845 may be performed by a first apparatus, and the remainder of the functionality of the semantic region transformer 835, the hierarchical semantic tree means 840, and/or the social tie discovering means 845 may be performed by one or more other apparatuses.

The apparatus 800 and the processor 805 may be configured to perform the following functionality via the semantic region transformer 835. The semantic region transformer 835 may be configured to perform a number of operations of an example method, such as the example method depicted in FIG. 3. In this regard, the semantic region transformer 835 may be configured to transform a cloaked region into corresponding semantic region is expressed with a semantic meaning of the cloaked region. According to some embodiments, the semantic region transformer 835 may be configured to select more than one sample location in a cloaked region; derive semantic meanings associated to each of more than one sample locations; and conclude semantic meanings of the cloaked region from the semantic meanings associated to each of more than one sample locations. In this regard, a semantic region which has a semantic meaning covering all of the semantic meanings associated to the more than one sample locations, may be selected as the semantic region of the cloaked region. According to some embodiments, the semantic meaning associated to a sample location may be derived by a reverse geocoding based on geographic coordinates of the sample location.

The apparatus 800 and the processor 805 may be configured to perform the following functionality via the hierarchical semantic tree means 840. The hierarchical semantic tree means 840 may be configured to perform a number of operations of an example method, such as the example method depicted in FIG. 3. In this regard, the hierarchical semantic tree means 840 may be configured to map the transformed semantic regions into nodes of a hierarchical semantic tree, wherein each node of the hierarchical semantic tree corresponds to a semantic region.

The apparatus 800 and the processor 805 may be configured to perform the following functionality via the social tie discovering means 845. The social tie discovering means 845 may be configured to perform a number of operations of an example method, such as the example method depicted in FIG. 3. In this regard, the social tie discovering means 845 may be configured to infer social ties among different users according to relationships between nodes mapped to semantic regions of the user's respective trajectories. According to some embodiments, the social tie discovering means 845 may be further configured to identify semantic regions on the different trajectories occurring within a same time period, as pair regions; compute similarities between nodes mapped to semantic regions of each pair of identified pair regions; and deduce a similarity between the different trajectories from the computed similarities. According to some embodiments, the social tie discovering means 845 may be further configured to compute similarities between nodes mapped to semantic regions of one pair of pair regions based on factors in at least one of the following three aspects: a level of the lowest common ancestor node of nodes mapped to semantic regions of the one pair of pair regions in the hierarchical semantic tree; the shortest length path between nodes mapped to semantic regions of the one pair of pair regions in the hierarchical tree; and a level of each node mapped to the semantic regions of the one pair of pair regions in the hierarchical tree.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

It should be appreciated that at least some aspects of the exemplary embodiments of the inventions may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, RAM, etc. As will be appreciated by one of skill in the art, the function of the program modules may be combined or distributed as desired in various embodiments. In addition, the function may be embodied in whole or in part in firmware or hardware equivalents such as integrated circuits, field programmable gate arrays (FPGA), and the like.

The present invention includes any novel feature or combination of features disclosed herein either explicitly or any generalization thereof. Various modifications and adaptations to the foregoing exemplary embodiments of this invention may become apparent to those skilled in the relevant arts in view of the foregoing description, when read in conjunction with the accompanying drawings. However, any and all modifications will still fall within the scope of the non-limiting and exemplary embodiments of this invention.

What is claimed is:

1. A method, comprising:
   transforming cloaked regions of a first trajectory of a first user and cloaked regions of a second trajectory of a second user to corresponding semantic regions, respectively, wherein a semantic region is expressed with a semantic meaning of a corresponding cloaked region;
   mapping the semantic regions to nodes of a hierarchical semantic tree, wherein each node of the hierarchical semantic tree corresponds to a semantic region; and
   determining that a social tie exists between the first user and the second user based on relationships between nodes mapped to semantic regions of the first trajectory and nodes mapped to semantic regions of the second trajectory.

2. A method of claim 1, wherein the social tie between the first user and the second user comprises a social relationship between the first user and the second user, and wherein transforming the cloaked regions to the corresponding semantic regions comprises:
   selecting more than one sample location in a cloaked region of the cloaked regions;
   deriving semantic meanings associated to each of the more than one sample locations; and
   concluding the semantic region of the cloaked region from the semantic meaning associated to the each of the more than one sample locations.

3. A method of claim 2, wherein the concluding the semantic region of the cloaked region comprises:
   selecting a semantic region which has a semantic meaning covering all of the semantic meanings associated to the more than one sample locations, as the semantic region of the cloaked region.

4. A method of claim 2, wherein a semantic meaning associated to a sample location is derived by a reverse geocoding based on geographic coordinates of the sample location.

5. A method of claim 1, further comprising:
   identifying the semantic regions on the first trajectory and the second trajectory, which occurred within a same time period, as pair regions;
   computing similarities between nodes mapped to the semantic regions of each pair of identified pair regions; and
   deducing a similarity between the first trajectory and the second trajectory from the computed similarities.

6. A method of claim 5, wherein the computed similarities between the nodes mapped to the semantic regions of one pair of the identified pair regions are computed based on factors in at least one of the following three aspects:
   a level of lowest common ancestor node of the nodes mapped to the semantic regions of the one pair of the pair regions in the hierarchical semantic tree;
   a shortest length path between the nodes mapped to the semantic regions of the one pair of the pair regions in the hierarchical tree; and
   a level of a node mapped to the semantic regions of the one pair of the pair regions in the hierarchical tree.

7. A method of claim 1, wherein the cloaked regions of the first trajectory and the cloaked regions of the second trajectory are cloaked through a k-anonymity algorithm according to different privacy levels.

8. An apparatus comprising:
   at least one processor; and
   at least one memory including computer program code,
   the at least one memory and the computer program code configured to, with the at least one processor, cause the apparatus to at least:
   transform cloaked regions of a first trajectory of a first user and cloaked regions of a second trajectory of a second user to corresponding semantic regions, respectively, wherein a semantic region is expressed with a semantic meaning of a corresponding cloaked region;
   map the transformed semantic regions to nodes of a hierarchical semantic tree, wherein each node of the hierarchical semantic tree corresponds to a semantic region; and
   determine that a social tie exists between the first user and the second user based on relationships between nodes mapped to semantic regions of the first trajectory and nodes mapped to semantic regions of the second trajectory.

9. An apparatus of claim 8, wherein the social tie between the first user and the second user comprises a social relationship between the first user and the second user, and wherein to transform the cloaked regions to the corresponding semantic regions, the apparatus is further caused to at least:
   select more than one sample location in a cloaked region of the cloaked regions;
   derive semantic meanings associated to each of the more than one sample locations; and
   conclude the semantic region of the cloaked region from the semantic meanings associated to the each of the more than one sample locations.

10. An apparatus of claim 9, wherein to conclude the semantic region of the cloaked region, the apparatus is further caused to at least:
- select a semantic region which has a semantic meaning covering all of the semantic meanings associated to the more than one sample locations, as the semantic region of the cloaked region.

11. An apparatus of claim 9, wherein a semantic meaning associated to a sample location is derived by a reverse geocoding based on geographic coordinates of the sample location.

12. An apparatus of claim 8, wherein the apparatus is further caused to at least:
- identify the semantic regions on the first trajectory and the second trajectory, which occurred within a same time period, as pair regions;
- compute similarities between the nodes mapped to semantic regions of each pair of identified pair regions; and
- deduce a similarity between the first trajectory and the second trajectory from the computed similarities.

13. An apparatus of claim 12, wherein the computed similarities between the nodes mapped to the semantic regions of one pair of the identified pair regions are computed based on factors in at least one of the following three aspects:
- a level of the lowest common ancestor node of the nodes mapped to the semantic regions of the one pair of the pair regions in the hierarchical semantic tree;
- the shortest length path between the nodes mapped to the semantic regions of the one pair of pair regions in the hierarchical tree; and
- a level of a node mapped to the semantic regions of the one pair of the pair regions in the hierarchical tree.

14. An apparatus of claim 8, wherein the cloaked regions of the first trajectory and the cloaked regions of the second trajectory are cloaked through a k-anonymity algorithm according to different privacy levels.

15. A non-transitory computer-readable storage medium carrying one or more sequences of one or more instructions which, when executed by one or more processors, causing an apparatus to:
- transform cloaked regions of a first trajectory of a first user and cloaked regions of a second trajectory of a second user to corresponding semantic regions, respectively, wherein a semantic region is expressed with a semantic meaning of a corresponding cloaked region;
- map the semantic regions to nodes of a hierarchical semantic tree, wherein each node of the hierarchical semantic tree corresponds to a semantic region; and
- determine that a social tie exists between the first user and the second user based on relationships between nodes mapped to semantic regions of the first trajectory and nodes mapped to semantic regions of the second trajectory.

16. The non-transitory computer-readable storage medium of claim 15, when executed by one or more processors, causing the apparatus to transform the cloaked regions to a corresponding semantic region further comprises:
- select more than one sample location in a cloaked region of the cloaked regions;
- derive semantic meanings associated to each of the more than one sample locations; and
- conclude the semantic region of the cloaked region from the semantic meanings associated to the each of the more than one sample locations.

17. The non-transitory computer-readable storage medium of claim 16, when executed by one or more processors, causing the apparatus to conclude the semantic region of the cloaked region further comprises, select a semantic region which has a semantic meaning covering all of the semantic meanings associated to the more than one sample locations, as the semantic region of the cloaked region.

18. The non-transitory computer-readable storage medium of claim 16, when executed by one or more processors, causing the apparatus further to derive the semantic meaning associated to a sample location a reverse geocoding based on geographic coordinates of the sample location.

19. The non-transitory computer-readable storage medium of claim 15, when executed by one or more processors, causing the apparatus further to:
- identify the semantic regions on the first trajectory and the second trajectory, which occurred within a same time period, as pair regions;
- compute similarities between nodes mapped to the semantic regions of each pair of identified pair regions; and
- deduce a similarity between the first trajectory and the second trajectory from the computed similarities.

20. The non-transitory computer-readable storage medium of claim 19, when executed by one or more processors, causing the apparatus further to compute similarities between the nodes mapped to the semantic regions of one pair of the identified pair regions based on factors in at least one of the following three aspects:
- a level of lowest common ancestor node of the nodes mapped to the semantic regions of the one pair of the pair regions in the hierarchical semantic tree;
- a shortest length path between the nodes mapped to the semantic regions of the one pair of the pair regions in the hierarchical tree; and
- a level of a node mapped to the semantic regions of the one pair of the pair regions in the hierarchical tree.

* * * * *